United States Patent [19]

Koseki

[11] Patent Number: 4,679,204
[45] Date of Patent: Jul. 7, 1987

[54] REAR MIRROR HOLDER DEVICE FOR A LASER GENERATOR

[75] Inventor: Ryoji Koseki, Buena Park, Calif.

[73] Assignee: Amada Engineering Service Co., Inc., LaMirada, Calif.

[21] Appl. No.: 814,982

[22] Filed: Dec. 31, 1985

[51] Int. Cl.$^4$ .............................................. H01S 3/08
[52] U.S. Cl. .................................. 372/107; 372/108; 372/65
[58] Field of Search ................. 372/107, 103, 99, 108, 372/98, 33, 64, 88, 55

[56] References Cited

U.S. PATENT DOCUMENTS

| | | | |
|---|---|---|---|
| 3,204,471 | 9/1965 | Rempel | 372/107 |
| 3,478,608 | 11/1969 | Met | 372/107 |
| 3,700,313 | 10/1972 | Karr et al. | 372/107 |
| 3,936,767 | 2/1976 | Besson | 372/55 |
| 3,953,113 | 4/1976 | Shull | 372/107 |
| 4,158,821 | 6/1979 | Bresman | 372/33 |
| 4,201,951 | 5/1980 | Mohler | 372/107 |
| 4,442,524 | 4/1984 | Reeder et al. | 372/108 |
| 4,475,202 | 10/1984 | Baron et al. | 372/64 |

Primary Examiner—Léon Scott, Jr.
Attorney, Agent, or Firm—Wigman & Cohen

[57] ABSTRACT

A holder for the rear mirror of a laser generator has a pressure balance orifice formed in the block supporting the rear mirror in the mirror mounting member. The orifice equalizes the pressure between the chamber through which the laser passes and a chamber formed by the support block and the rear mirror. An additional pressure balance orifice is formed in the support block between a chamber formed by a power monitor supported in the support block and the chamber formed by the rear mirror in the support block, thus equalizing the pressure between these chambers. Another pressure balance orifice is formed in an addditional block supporting a total reflection mirror in the mirror mounting member, between the laser chamber and a chamber formed by the total reflection mirror in the block. Pressure is thus equalized between these two chambers. The rear mirror holder is removably mounted on the mirror mounting member by means of a separating member which may be wedged between the rear mirror holder and the mirror mounting member to separate them.

8 Claims, 7 Drawing Figures

REAR MIRROR HOLDER DEVICE FOR A LASER GENERATOR

FIELD OF THE INVENTION

The present invention relates to a gas laser beam generator, and in particular to a rear mirror holder device which removably supports a rear mirror in a gas laser beam generator.

DESCRIPTION OF THE BACKGROUND

There are various types of gas laser beam generators, such as high speed axial, biaxial transverse, and triaxial transverse types. All of these, however, are equipped with both rear mirrors and output mirrors, and generally, the action of changing the mirrors in the resonator, especially the rear mirror, is very troublesome. The reason is that, in many cases, the laser head is incorporated in the machine, and in such a case there is inadequate working space, so that considerable time is required to complete the work. In addition, an already known power monitor is generally mounted on a rear mirror holder at the laser head. In a mirror having this type of construction, there is the problem that the normal changes in atmospheric pressure added to the thickness of the mirror body tend to distort the mirror. At the present time, the mirror body is generally made thicker as a measure to prevent distortion of the rear mirror.

SUMMARY OF THE INVENTION

An object of the present invention is to provide, with due consideration to the drawbacks of such conventional devices, a rear mirror holder device for a laser generator which prevents distortion of the rear mirror caused by atmospheric pressure, and makes it possible to easily exchange the rear mirror.

In order to accomplish this object, in the present invention, a mirror mounting member is mounted in a removable manner on a rear mirror holder which is removably supported on a support plate, and a support member which houses the rear mirror is installed on a mirror mounting member. A first pressure balance orifice is provided in one end section of the supporting member. A first chamber provided inside the mirror mounting member, and a second chamber provided on the rear side of the rear mirror in the supporting member communicate by means of the first pressure balance orifice.

A supporting member which houses a total reflection mirror is mounted on the mirror mounting member. A second pressure balance hole is provided in one end section of the supporting member. The first chamber provided inside the mirror mounting member, and a third chamber provided on the rear side of the total reflection mirror in the supporting member are connected by means of the second pressure balance hole.

In addition, a power monitor is housed in the rear mirror rear side supporting member which houses the rear mirror, and a third pressure balance hole is formed in the supporting member between the second chamber provided between the rear mirror and the power monitor and a fourth chamber provided on the rear side of the power monitor on the supporting member. This third pressure balance hole is for communication between the second chamber and the fourth chamber.

The mirror mounting member is mounted on the rear mirror holder which is removably supported on the support plate, and a space is provided between the rear mirror holder and the mirror mounting member. A mirror mounting member separating member which can advance or retreat in this space is mounted on the peripheral wall section of the rear mirror holder.

BRIEF DESCRIPTION OF THE DRAWING

These and other objects, features and advantages of the present invention will become more apparent from the following description of a preferred embodiment taken in conjunction with the accompanying drawings, in which.

DESCRIPTION OF THE PREFERRED EMBODIMENTS

Figure 1:
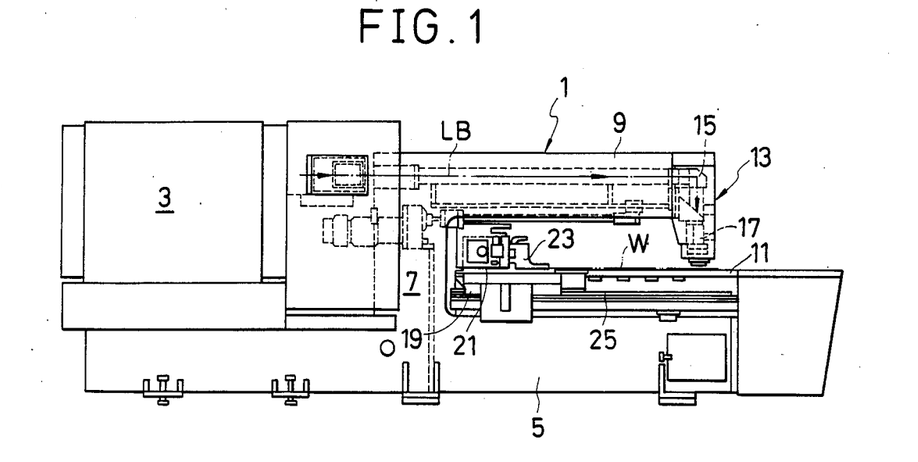
FIG. 1 is a front elevational view showing a laser processing machine provided with the laser generator related to the present invention.

Referring to FIG. 1, generally designated by the reference numeral 1, is a laser processing system which is provided with a laser oscillator 3. The laser oscillator 3 is mounted on the rear of the laser processing system 1 so as to generate a laser beam LB in the direction toward the laser processing system 1.

The laser processing system 1 consists of a base 5, a post 7 which rises perpendicularly from the base 5, and an overhead beam 9 which is provided above and supported horizontally in a cantilever manner by the post 7. Disposed on the base 5 is a work table 11 on which a large number of slide balls are rotatably positioned to support a sheet work piece W to be processed in a horizontal position.

A processing head assembly body 13 is mounted on the free end of the above-mentioned overhead beam 9; a mirror assembly 15 and a light focusing lens 17 are built in to the processing head assembly body 13. The above-mentioned mirror assembly 15 reflects laser beam LB generated by the laser oscillator 3 in the direction of work piece W. The light focusing lens 17 concentrates the light of laser beam LB and is mounted in such a position that it aims laser beam LB at the work piece W together with an asisting gas such as oxygen. Consequently, the laser processing system 1, which is constructed as described previously, receives the laser beam LB from the laser oscillator 3 and aims the laser beam LB at the piece W through the light forcusing lens 17 which is mounted inside the processing head assembly 13.

In order to move and position in place the work piece W to be processed, the laser processing system 1 has a first carriage 19 which is free to move horizontally and a second carriage 21 which has a plurality of clamping devices 23 which clamp the work piece W in position. The first carriage 19 is movably supported on a pair of rails 25 which are mounted parallel to each other on the base 5 along the opposite sides thereof, and is free to move toward and away from the processing area directly below the processing head assembly 13, when driven by power. The second carriage 21 which has the clamping devices 23 is slidably supported on the first carriage 19 and movable horizontally when driven in a direction perpendicular to the above-mentioned rails 25. Consequently, the work piece W which is clamped in place by the clamping devices 23 can be moved on the work table 11 by the motion of the first carriage 19 and the second carriage 21 to a position directly below the processing head assembly 23.

In the above-mentioned configuration, by positioning the work piece W immediately below the processing head assembly 13 on the work table 11 by means of the motion of the first carriage 19 and the second carriage 21, the work piece W is processed by the laser beam LB. Of course, the laser beam LB, which is generated by the laser oscillator 3, is directed at the processing head assembly 13 and directed downward as shown by the arrow by the mirror assembly 15. Then, after the light is concentrated by the light focusing lens 17, it is directed at the work piece W together with an assisting gas such as oxygen.

Figure 2:
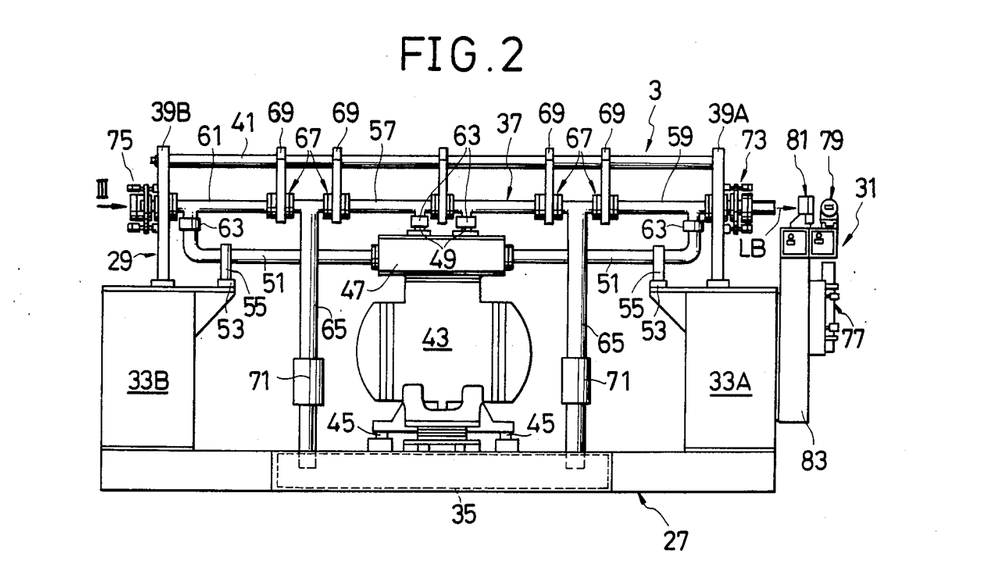
FIG. 2 is a front elevational view of the laser generator related to the present invention.

Now referring to FIG. 2, the laser oscillator 3 comprises a support trestle 27 which supports the whole oscillator, a laser oscillation or lasing section 29 which is supported on the support trestle 27, an adjustment attachment section 31 which is used for adjustment of the optical system of the laser processing system 1 and-/or for adjustment of the mirrors in the laser oscillation section 29. That is to say, the support trestle 27 is constructed of a plurality of square pipes arranged in a rectangular shape; box-shaped support platforms 33A and 33B, which stand on the right and left sides of the support trestle 27, in turn support the laser oscillation section 29. The adjustment attachment section 31 may be mouned on the support platform 33A on the output side of the laser oscillation section 29.

As clearly understood from FIG. 2, in order to cool the laser gas comprising a gas mixture of He, $N_2$ and $CO_2$ recirculated from the laser oscillation section 29, a relatively large main heat exchanger 35 is provided at the central portion of the support trestle 27. The main heat exchanger 35 is provided with bent tubes for receiving a coolant such as cooling water and with a plurality of cooling fins etc.

The laser oscillation section 29 comprises a laser tube 37 extending in the right and left directions to resonate and amplify the excitation light. The opposite ends of the laser tube 37 are supported by vertical support plates 39A, 39B which are supported by the support platforms 33A and 33B. The support plates 39A, 39B extend in the forward and rearward directions, perpendicular to the direction in which the laser tube 37 extend. The support plates 39A, 39B are integrally connected by a plurality of tie rods 41.

In order to supply laser gas to the insides of the laser tubes 37, the laser tube 37 is connected to a gas circulation drive means 43, and in addition, in order to cool the laser gas which is heated by electrical discharges inside the laser tube 37, the laser tube 37 is connected to the main heat exchanger 35. That is to say, the gas circulation drive means 43, comprising for instance a Root's blower, receives laser gas that has been cooled inside the main heat exchanger 35 and supplies it to the laser tube 37, and is supported on top of the main heat exchanger 35 through a plurality of vibration-absorbing pieces of rubber 45.

On the upper part of the gas circulation drive means 43, there is an auxiliary heat exchanger 47 to remove the heat produced by the gas circulation drive means 43 and to insure adequate cooling of the laser gas supplied to the laser tube 37.

The auxiliary heat exchanger 47 might, for example, be a heat exchanger that uses cooling water and be of a box shape. A plurality of connecting pipes 49 are mounted vertically on the top surface of the auxiliary heat exchanger 47, and there are a plurality of connecting pipes 51 each having a base horizontally connected to either side of the auxiliary heat exchanger 47. The tips of each of the connecting pipes 51 extend to near the opposite ends of the laser tube 37, and the connecting pipe 51 is supported near the tips thereof through vibration-absorbing pieces of rubber 53 by supporting blocks 55 mounted on the support platforms 33A and 33B. Consequently, the vibrations of the gas circulation drive means 43 are not transmitted to the support trestle 27 and/or to the support platforms 33A and 33B.

In order to supply the laser gas which is ejected from the gas circulation drive means 43 to the laser tube 37, the connecting pipes 49 are connected to the laser tube 37 near the center thereof. The tips of each of the connecting pipes 51 are connected near the opposite ends of the laser tube 37. More specifically, the laser tube 37 is divided in three sections of a central tube 57 and end tubes 59, 61 at the opposite sides of the central tube 57. Connecting pipe 49 is connected to the central tube 57 and the connecting pipes 51 are respectively connected to the end tubes 59 and 61, through flexible joints 63 which are made of cylindrical pieces of silicone rubber etc. Consequently, the vibrations of the gas circulation drive means 43 are not transmitted to the laser tube 37, and small shifts in any direction in the relative positions of the connecting pipes 49 and the laser tube 37 are taken up by the flexible joints.

In order to produce electrical discharges in laser tube 37, anode and cathode pairs are mounted at a plurality of locations in the laser tube 37. In order to cool the laser gas that is heated by the electrical discharges in the laser tube 37, the laser tube 37 is connected to the main heat exchanger 35. That is to say, the joints 63 has an anode (not shown) provided therein, respectively. Connected between the central tube 57 and the end tubes 59 and 61 of the laser tube 37 through a plurality of cathode assemblies 67 each having a cathode therein (not shown) are gas recirculation paths 65, of which the upper ends are T-shaped and the lower ends are connected to the main heat exchanger 35 through bellows. The cathode assemblies 67 are supported by a holder plate 69 supported by the tie rods 41 connected to the right and left support plate 39A and 39B. Consequently, the laser gas that is supplied from the gas circulation drive means 43 through the auxiliary heat exchanger 47 to the laser tube 37 flows back to the main heat exchanger 35 through the gas recirculation paths 65 and, after being cooled in the main heat exchanger 35, is fed to the gas circulation drive means 43, cooled further securely, by the auxiliary heat exchanger and then supplied again to the laser tube 37.

As clearly understood from the foregoing description, a plurality of locations are provided in the laser tube 37, where electrical discharges are produced by pairs of the anodes and cathodes, and the laser gas heated by the electrical discharges in the laser tube 37 is recirculated back to the main heat exchanger 35 through each of the gas recirculation paths 65. In order to neutralize the laser gas that has been ionized by electrical discharges in the laser tube 37, a suitable catalyst is placed in the midway of each gas recirculation path 65. That is to say, in the midway of each gas recirculation path 65, there is an enlarged portion 71, and within the enlarged portion 71, there is a honeycomb-shaped activated alumina catalyst which might, for example, contain platinum.

In the configuration described above, the catalyst in each of the gas circulation paths 65 is heated by the laser gas, which increases the effectiveness of the catalyst. The laser gas which passes through the enlarged portion containing catalyst is neutralized by the action of the catalyst and then flows back to the main heat exchanger 35 as a neutral gas. Consequently, wasteful electrical discharges which would otherwise tend to occur between the cathodes and the main heat exchanger 35 are suppressed, thereby increasing the efficiency of the input power.

Also as clearly understood from FIG. 2, in order to produce resonance and amplification of the excitation light excited by electrical discharges in the laser tube 37, an output mirror assembly 73 and a rear mirror assembly 75 are provided such that the output mirror assembly 73 which has an output mirror therein is mounted on one end of the laser tube 37, while the rear mirror assembly 75 containing a suitable reflecting mirror therein is mounted on the other side of the laser tube 37. The output mirror assembly 73 and the rear mirror assembly 75 are mounted on the support plates 39A and 39B through bellows so that their orientation can be adjusted freely. Consequently, the mirror adjustment of the laser oscillation section 29 is made by suitable adjustment in orientation of each of the output mirror assembly 73 and the rear mirror assembly 75.

Referring to FIG. 2, the adjusting attachment section 31 comprises a helium-neon laser oscillator 77, a beam bender 79, a beam damper 81, etc. The helium-neon oscillator 77 is to be used in the adjustment of mirrors in the output mirror assembly 73, the rear mirror assembly 75, etc. in the laser oscillation section 29, and in the adjustment of the optical system in the laser processing system 1. As is clear from FIG. 2, the helium-neon laser oscillator 77 is vertically mounted on a support bracket 83 mounted on the support platform 33A. The beam bender 79 is provided with a reflecting mirror or prism as a beam bending section to selectively bend the laser beam from the helium-neon laser oscillator 77 either into the laser tube 37 in the laser oscillation section 29 or toward the laser processing system 1. The beam bender 79 is located above the helium-neon laser oscillator 77 in the present embodiment. The beam damper 81 can absorb or block the laser beam LB from the output mirror assembly 73 in the laser oscillation section 29 and is free to move forward and backward with reference to the path of laser beam LB.

The beam damper 81 may be a metallic member in a conical shape which is well polished to absorb the laser beam LB by repeated reflection, and always cooled by water etc. Since the laser beam LB is prevented from advancing by the beam damper 81 when located in the passage of the laser beam LB, any unexpected accident which would be otherwise caused by careless supply of the laser beam LB to the laser processing system 1 can be avoided. Whether the beam bender 79 and the beam damper 81 are located on the passage of the laser beam LB or not is detected by a respective limit switch (not shown) arranged in correspondence with the forward position or backward position.

As is clear from the foregoing description, according to the present invention, a single visible light laser oscillator can be used for both the mirror adjustment in the gas laser oscillator and the adjustment of the optical system in the laser processing system, which provide easy adjustment in the optical system.

Figure 3:
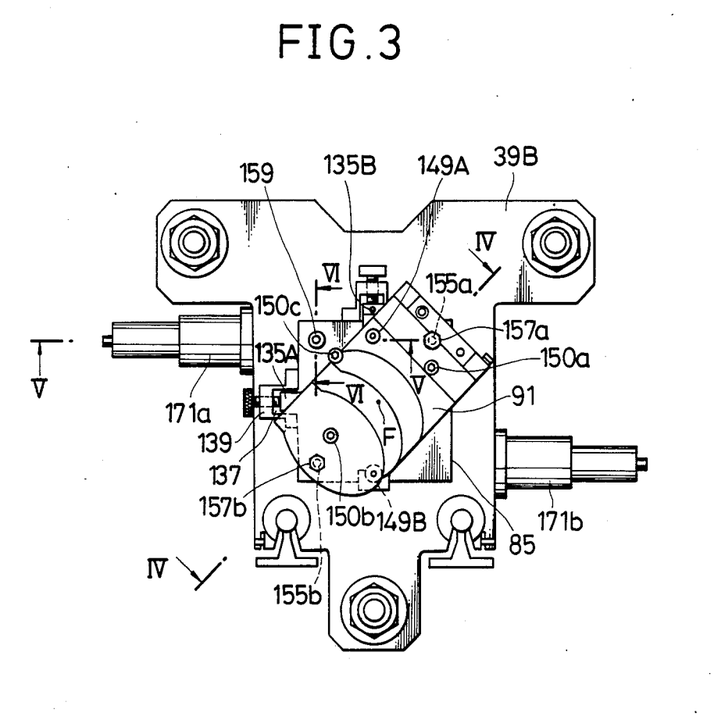
FIG. 3 is a view taken in the direction of the arrow III showing only the rear mirror assembly which is removably supported on the support plate in FIG. 2.
Figure 4:
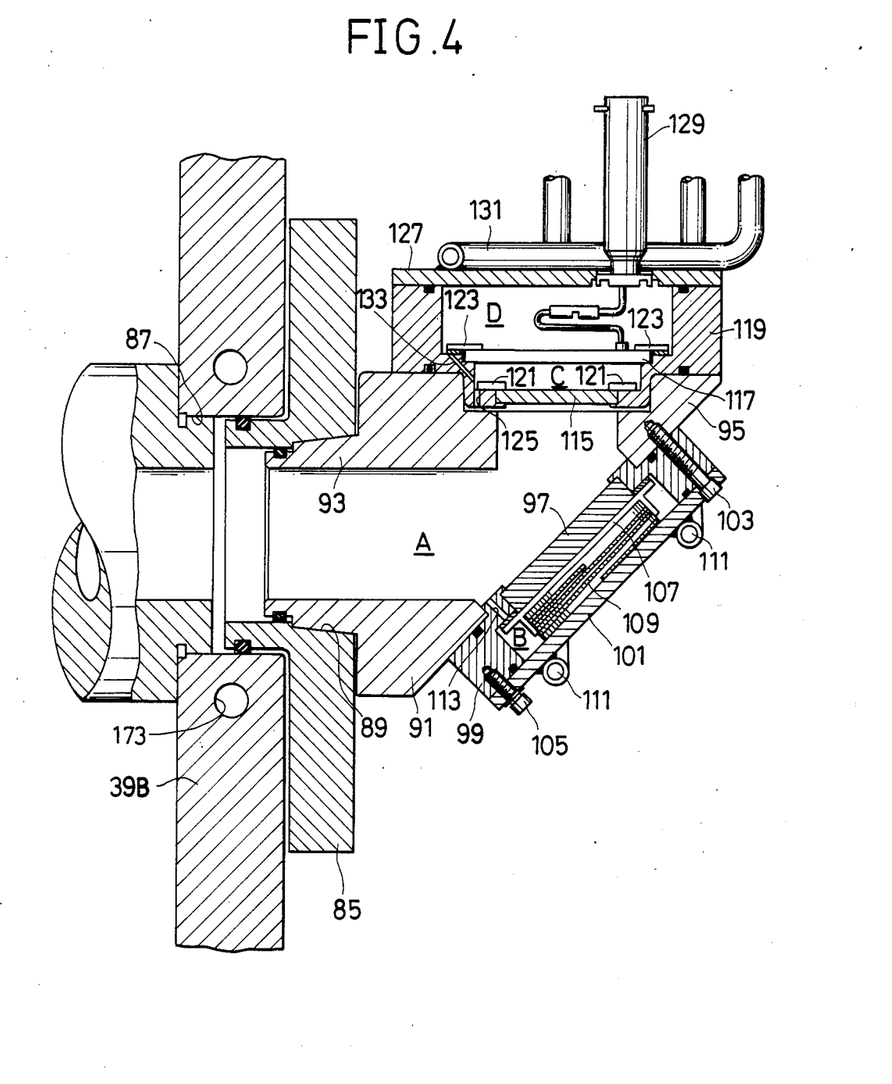
FIG. 4 is an expanded cross sectional view along the line IV—IV of FIG. 3.

In the rear mirror holder device of the present invention, a rear mirror holder 85 is mounted on a support plate 39B. Specifically, as shown in FIG. 3 and FIG. 4, a through hole 87, through which the laser beam LB has free passage, is formed in the central portion of the support plate 39B in order to mount the rear mirror holder 85. The rear mirror holder 85 is mounted in this through hole 87. A tapered section 93 of a mirror mounting block 91 is installed by inserting snuggly into a tapered hole 89 formed in the center section of the rear mirror holder 85.

In the rear section of the mirror mounting block 91, in a slanted section 95 which is inclined at, for example, a 45 degree angle, a support block 99 which houses a total reflection mirror 97, and a retaining presser member 101 which supports the support block 99 are secured by a bolt 103. The support block 99 and the presser member 101 are fastened together by a bolt 105. The total reflection mirror 97 is held against the inner side of the support block 99 by a presser member 107 and secured with a bolt or the like.

A spiral heat transmitting and cooling device 109 is interposed between the presser member 107 and the presser member 101. The total reflection mirror 97 is prevented from heating by being cooled through the presser member 101 by a cooling pipe 111 which is mounted on the presser member 101.

A first pressure balance orifice 113 is formed in one end section of the support block 99. A first chamber A within the mirror mounting block 91 and a second chamber B within the support block 99 communicate through the first orifice 113 so that, because the pressures in chamber A and chamber B are balanced, there is almost a complete lack of distortion in the total reflection mirror 97 caused by atmospheric pressure.

In addition, a support block 119 which houses a rear mirror 115 and a power monitor 117 is installed on the upper section of the mirror mounting block 91. The rear mirror 115 is secured to the support block 119 by a stopper member 121. The power monitor 117 is secured to the support block 119 by a stopper member 123. A third chamber C between the rear mirror 115 and the power monitor 117, and the first chamber A within the mirror mounting block 91 communicate through a second pressure balance orifice 125 formed in the end section of the support block 119. As a result, because the pressures in chamber A and chamber C are balanced, there is almost a complete lack of distortion in the rear mirror 115 caused by atmospheric pressure.

In addition, a presser member 127 is installed on the upper surface of the support block 119, and a contact-type connector 129 is mounted on one end section of the presser member 127. The connector 129 is connected to the power monitor 117. A cooling pipe 131 is installed on the presser member 127.

A fourth chamber D within the support block 119, and the chamber C communicate through a third pressure balance orifice 133 which is formed on a slant in one end section of the inside of the support block 119. Therefore, because the pressures in chamber C and chamber D are balanced through the third pressure balance orifice 133 there is almost a complete lack of distortion in the pressure monitor 117 caused by atmospheric pressure.

Accordingly, because the total reflecting mirror 97, the rear mirror 115, and the power monitor 117 are provided with the first pressure balance orifice 113, the second orifice 125, and the third orifice 133, which communicate with the chambers A, B, C, and D, the distortion caused by atmospheric pressure disappears.

Figure 5:
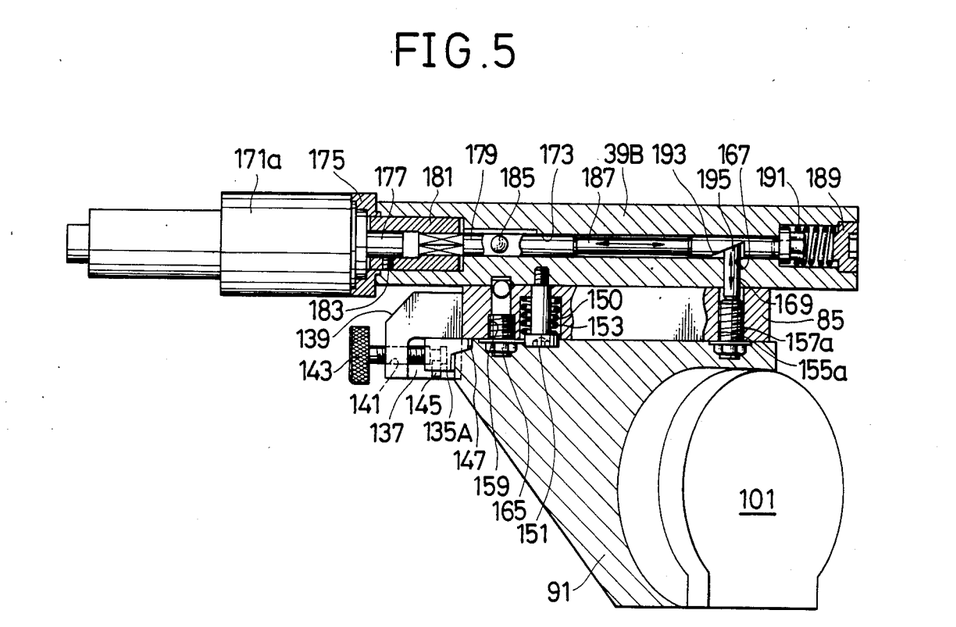
FIG. 5 is an expanded cross sectional view along the line V—V of FIG. 3.

The procedures for installing the mirror mounting block 91 in the rear mirror holder 85 have already been discussed. However, the removal of the mirror mounting block 91 from the rear mirror holder 85 is carried out with a mirror mounting block separating liner which is installed on one side end section and the upper end section of the rear mirror holder 85. Specifically, as shown in FIG. 3, and FIG. 5, a plurality of mirror mounting block separating liners 135A and 135B are provided wherein these liners 135A and 135B are installed on the one side end section and the upper end section respectively of the rear mirror holder 85. Because these liners 135A and 135B are installed in an identical manner, the explanation of the installation of the liner 135B will be omitted.

As is indicated in FIG. 5 in particular, a bracket 139, in whose inner section a channel 137 is formed, is secured to one side end section of the rear mirror holder 85 by a bolt or the like. The liner 135A mates with the channel 137 within the bracket 139. Furthermore, the liner 135A is screwed to the tip section of a male bolt 143 with a bolt 145. The male bolt 143 mates with a female screw section 141 which is threaded into almost the dead center of the bracket 139. In addition, the tip of the liner 135A moves in the forward and reverse directions in a space 147 provided between the mirror mounting block 91 and the rear mirror holder 85. However, when the mirror mounting block 91 is removed from the rear mirror holder 85, by rotating the bolt 143 in the clockwise direction, the liner 135A which is installed on the tip section of the bolt 143 moves forward, and is wedged into the space 147. The liner 135B is wedged in, in the same manner, and the mirror mounting block 91 is easily separated from the rear mirror holder 85, and thus can be removed with ease. Also, as shown in FIG. 3, a plurality of spring-equipped shoulder bolts 149A and 149B are provided, and the shoulder bolts 149A and 149B are inserted in two locations in the mirror mounting block 91. Pressure is applied with uniform spring force by the spring-equipped shoulder bolts 149A and 149B, and the mirror mounting block 91 is temporarily secured on the rear mirror holder 85. This securing prevents the mirror mounting block 91 from falling off the rear mirror holder 85 during transportation.

The fine adjustment of the rear mirror is performed by adjusting the rear mirror holder 85 backward and forward. Specifically, as is shown in FIG. 3 and FIG. 5, a plurality of concave sections 150 are formed in a plurality of locations on the other side of the rear mirror holder 85. A coil spring 153 is installed under compression between the rear mirror holder 85 and a plurality of bolts 151 which penetrate the concave section 150 and are secured on the support plate 39B. Accordingly, the rear mirror holder 85 is pressed in the direction of the support plate 39B by the energization of a plurality of coil springs 153.

Figure 6:
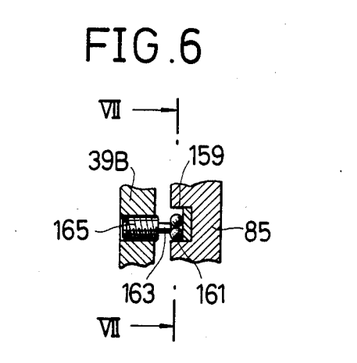
FIG. 6 is an expanded cross sectional view along the line VI—VI of FIG. 3.
Figure 7:
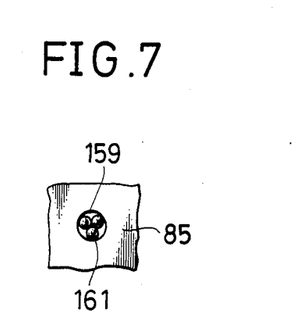
FIG. 7 is a cross sectional view along the line VII—VII of FIG. 6.

A plurality of concave sections 150 are provided, as shown in FIG. 3, that is, these concave sections 150 are formed at three points, which are a first position 150a and a second position 150b, symmetrically positioned with reference to the axis F of the rear mirror holder 85, and an upper third position 150c which bisects almost perpendicularly a straight line linking the first and second positions, 150a and 150b. In addition, a plurality of through holes 155a and 155b are formed on one side surface of the rear mirror holder 85, at a position close to the first position 150a and the second position 150b, symmetrically with reference to the centerline of the rear mirror holder 85. A plurality of adjusting bolts 157a and 157b are installed by being screwed to the tip sections of the through holes 155a and 155b respectively. A circular concave section 159 is formed in a position close to the third position 150c, on the bisector of a straight line joining the bolts 157a and 157b, as shown in FIG. 5, FIG. 6, and FIG. 7. A first axis joining the concave section 159 with the bolt 157a, and a second axis joining the concave section 159 with the bolt 157b, are transversely related. Three steel balls 161 are housed in the concave section 159. These three balls 161 are restrained by the peripheral walls of the concave section 159, and are also restrained by their mutual contact.

In order to support the rear mirror holder 85 in a freely swinging manner, an adjusting screw 165, provided with a hemispherical section 163 which can be extended to engagingly fit among the three steel balls 161, is screwed to the support plate 39B, in a position corresponding to the concave section 159 in which the three steel balls 161 are housed.

In addition, an orifice 167 of a diameter slightly smaller than the through holes 155a and 155b is formed at a position in the support plate 39B opposite the through holes 155a, 155b formed in the rear mirror holder 85. A pin 169 for swinging the rear mirror holder 85 in the forward and backward direction is interpositioned between the through holes 155a, 155b and the orifice 167.

In order to move the pin 169 in the vertical direction, as shown in FIG. 3, a plurality of control motors 171a and 171b, which may be servomotors, are respectively installed in a direction transverse to the orifice 167 in the support plate 39B, that is, in a direction horizontal on the side surfaces of the rear mirror holder 85. Furthermore, the specific drive mechanism which swings the rear mirror holder 85 in the forward and backward directions by means of the control motors 171a and 171b is exactly as mentioned previously, so an explanation of the drive for swinging the rear mirror holder 85 in the forward and backward directions by means of the control motors will be omitted here.

As shown in FIG. 5, a through hole 173, both ends of which are stepped to a large diameter, is formed in the center shaft section of the support plate 39B. A support bracket 175 is set in the large diameter section of the rear end section of the stepped through hole 173 for installing the control motor 171a. An output shaft 177, which projects from the tip section of the control motor 171a, fits into the large diameter section of the stepped through hole 173 and is joined by a spline coupling 181 to a microscrew 179 inside the stepped through hole 173. The spline coupling 181 is secured to the output shaft 177 by a setscrew 183. The microscrew 179 is connected to a shaft 187 through a ball 185.

An adjusting plug 189 is set into the tip section of the stepped through hole 173. A spring 191 is interposed in the large diameter section of the stepped through hole 173 between the shaft 187 and the plug 189, and the spring 191 is normally biased toward the shaft 187. A notch 193 is cut into one section of the shaft 187 and a slanted section 195 of the pin 169 makes contact with the notch 193.

However, when the control motor 171a is activated, the rotation of the control motor 171a is transmitted to the output shaft 177. This rotation transmitted to the output shaft 177 causes a backward and forward movement of the microscrew 179 housed in the spline coupling 181. Further, because the micfoscrew 179 is connected to the shaft 187 through the ball 185, the backward and forward movement of the microscrew 179 is transmitted to the shaft 187, and the shaft 187 moves backward and forward. During the backward and forward movement of the shaft 187, the wedge 183 cut into one section of this shaft 187 makes contact with the slanted section 195 of the pin 169. As a result, the slanted section 195 of the pin 169 slides along the flat surface of the wedge 183, moving the pin 169 vertically.

This vertical movement of the pin 169 causes the rear mirror holder 85 to also move vertically, so that the rear mirror holder 85 swings slightly around the first axis and the second axis, providing a fine adjustment of the angle of incline of the rear mirror 115.

With this embodiment of the present invention, it is possible to prevent distortion of the total reflection mirror and the rear mirror resulting from changes in atmospheric pressure, because respective support members are installed which house the rear mirror and the total reflection mirror in the rear end section and upper surface section of the mirror mounting member which is mounted so that removal of the rear mirror holder is possible, while the first chamber within the mirror mount member and the second, third, and fourth chambers in the respective support members are able to communicate through the first, second, and third pressure balance orifices formed in the respective support members.

In addition, the mirror mounting member can be easily removed from the rear mirror holder by wedging the mirror mount member removal member into the space provided between the rear mirror and the mirror mounting member. Furthermore, because the mirror mounting member can be easily removed from the rear mirror holder, after the mirror mounting member is removed form the rear mirror holder, the rear mirror can be easily exchanged in an area where there is room to do the work.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A rear mirror holder device for a laser generator comprising:
   a support plate, a rear mirror holder supported on said support plate, a mirror mounting member removably mounted to said rear mirror holder and having a first chamber formed therein for the passage of the beam generated by said laser generator;
   a support member installed on said mirror mounting member, said support member housing a rear mirror, said rear mirror having a front side and a rear side, the front side of said mirror facing said first chamber, said support member being provided with a first pressure balance orifice formed on one end section of said support member, and said support member having a second chamber formed on the rear side of said rear mirror whereby said first and second chambers communicate with each other through the first pressure balance orifice.

2. A rear mirror holder device for a laser generator comprising:
   a support plate, a rear mirror holder supported on said support plate, a mirror mounting member removably mounted to said rear mirror holder and having a first chamber formed therein for the passage of the beam generated by said laser generator;
   a support member installed on said mirror mounting member, said support member housing a rear mirror, said rear mirror having a front side and a rear side, the front side of said mirror facing said first chamber, said support member being provided with a first pressure balance orifice formed on one end section of said support member, and said support member having a second chamber formed on the rear side of said rear mirror whereby said first and second chambers communicate with each other through the first pressure balance orifice;
   wherein a second support member is installed on the mirror mounting member, said second support member housing a total reflection mirror having a front side and a rear side, the front side of said total reflecting mirror facing said first chamber, said second support member having a third chamber provided on the rear side of the total reflection mirror; and
   a second pressure balance orifice is formed on one end section of the second support member, whereby said first chamber within the mirror mount member and said third chamber provided on the rear side of the total reflection mirror within the second support member communicate through the second pressure balance orifice.

3. A rear mirror holder device for a laser generator comprising:
   a support plate, a rear mirror holder supported on said support plate, a mirror mounting member removably mounted to said rear mirror holder and having a first chamber formed therein for the passage of the beam generated by said laser generator;
   a support member installed on said mirror mounting member, said support member housing a rear mirror, said rear mirror having a front side and a rear side, the front side of said mirror facing said first chamber, said support member being provided with a first pressure balance orifice formed on one end section of said support member, and said support member having a second chamber formed on the rear side of said rear mirror whereby said first and second chambers communicate with each other through the first pressure balance orifice;
   wherein a power monitor is housed in the support member, said power monitor having a front face and a rear face, the front face of said power monitor and the rear face of said rear mirror forming a second chamber in the support member, the rear face of said power monitor forming a third chamber in the support member;

a second pressure balance orifice is formed within the support member between said second chamber provided between the rear mirror and the power monitor and said third chamber provided on the power mount rear side of the support member whereby;

the second chamber and the third chamber communicate through the second pressure balance orifice.

4. A rear mirror holder device for a laser generator comprising:

a support plate, a rear mirror holder supported on said support plate, a mirror mounting member removably mounted to said rear mirror holder and having a first chamber formed therein for the passage of the beam generated by said laser generator;

a first support member installed on said mirror mounting member, said first support member housing a rear mirror, said rear mirror having a front side and a rear side, the front side of said mirror facing said first chamber, said first support member being provided with a first pressure balance orifice formed on one end section of said first support member, and said first support member having a second chamber formed on the rear side of said rear mirror whereby said first and second chambers communicate with each other through the first pressure balance orifice;

wherein a power monitor is housed in said first support member, said power monitor having a front face and a rear face, said front face of said power monitor and the rear face of said rear mirror forming a second chamber in the support member, the rear face of said power monitor forming a third chamber in said first support member;

a second pressure balance orifice is formed within said first support member between said second chamber provided between the rear mirror and the power monitor and said third chamber provided on the power mount rear side of said first support member whereby;

the second chamber and the third chamber communicate through the second pressure balance orifice; and wherein a second support member is installed on the mirror mounting member, said second support member housing a total reflection mirror having a front side and a rear side, the front side of said total reflection mirror facing said first chamber, said second support member having a fourth chamber formed therein on the rear side of the total reflection mirror; and a third pressure balance orifice is formed on one end section of the second support member, whereby said first chamber in the mirror mount member and said fourth chamber provided on the rear side of the total reflection mirror communicate through said third pressure balance orifice.

5. A rear mirror holder for a laser beam generator comprising:

a first chamber formed in said rear mirror holder for the passage of a laser beam;

a rear mirror disposed in said first chamber;

a support member supporting said rear mirror in said first chamber and forming together with said rear mirror, a second chamber;

a pressure balance orifice formed in said support member interconnecting said first chamber and said second chamber whereby the pressure between said chambers is equalized.

6. The holder of claim 5, further comprising:

a total reflection mirror disposed in said first chamber;

a second support member supporting said total reflection mirror in said first chamber and forming, together with said total reflection mirror, a third chamber;

a second pressure balance orifice formed in said second support member between said first chamber and said third chamber whereby the pressure between first and third chambers is equalized.

7. The holder of claim 5 further comprising:

a power monitor disposed in said support member and forming, together with said support member, a third chamber;

a second pressure balance orifice formed in said support member between said second chamber and said third chamber whereby the pressure between said second and third chambers is equalized.

8. The holder of claim 7 further comprising:

a total reflection mirror disposed in said first chamber;

a second support member supporting said total reflection mirror in said first chamber and forming, together with said total reflection mirror, a fourth chamber;

a third pressure balance orifice formed in said second support member between said first chamber and said fourth chamber whereby the pressure between said first and fourth chambers is equalized.

* * * * *